US005983739A

United States Patent [19]
Feder

[11] Patent Number: 5,983,739
[45] Date of Patent: Nov. 16, 1999

[54] DOOR LOCK ACTUATOR

[76] Inventor: David A. Feder, 22821 Overlake, Saint Clair Shores, Mich. 48080

[21] Appl. No.: 08/844,219

[22] Filed: Apr. 18, 1997

Related U.S. Application Data

[63] Continuation-in-part of application No. 08/523,114, Sep. 1, 1995, Pat. No. 5,634,676.

[51] Int. Cl.[6] .................... F16H 27/02
[52] U.S. Cl. .................... 74/89.15; 74/424.8 R; 70/280
[58] Field of Search .................... 74/89.15, 424.8 R; 185/40 R; 70/277, 280, 284, 285, 237

[56] References Cited

U.S. PATENT DOCUMENTS

| | | |
|---|---|---|
| 1,337,235 | 4/1920 | Kuhn . |
| 1,431,290 | 10/1922 | Daggett, Jr. . |
| 1,740,971 | 12/1929 | Corlett . |
| 2,706,967 | 4/1955 | Iannetti . |
| 2,716,567 | 8/1955 | Turcott . |
| 2,859,060 | 11/1958 | Davies et al. . |
| 2,999,712 | 9/1961 | Jakeway . |
| 3,143,365 | 8/1964 | Egger . |
| 3,154,333 | 10/1964 | Townsend . |
| 3,385,620 | 5/1968 | Porvin . |
| 3,640,560 | 2/1972 | Zawadzki et al. . |

(List continued on next page.)

FOREIGN PATENT DOCUMENTS

| | | |
|---|---|---|
| 0433103A2 | 6/1991 | European Pat. Off. . |
| WO8910458 | 11/1989 | WIPO . |

OTHER PUBLICATIONS

Door Lock Actuator Product of ITT Automotive, Auburn Hills, MI 48326. 1st Publication Date Unknown.
Door Lock Actuator Product of Delphi Automotive Systems, Pontiac, MI 48340. 1st Publication Date Unknown.
Door Lock Actuator Product of Gecom, Division of Mitsui Corp., Southfield, MI 48075. 1st Publication Date Unknown.
Door Lock Actuator Product of Aisin Seiki of Kariya City, Japan. 1st Publication Date Unknown.
Door Lock Actuator Product of Either Rockwell–Meritor of Troy, MI 48084 or Bosch of Broadview, IL 60153. 1st Publication Date Unknown.
Photograph of Power Door Lock Actuator of Rockwell Corp, Troy, MI on Market Since at Least Feb. 13, 1998.
Photograph of Power Door Lock Actuator of Kiekert GmbH & Co. Heiligenhaus, Germany. On Market Since Before Mar. 1997.
Picture of Power Door Lock Actuator of Rockwell Corp., Troy, MI; On Market Since at Least Before Sep. 1, 1994.
Picture of Power Door Lock Actuator of Kelsey–Hayes Co., Romulus, MI; On Market Since at Least Before Sep. 1, 1994.

(List continued on next page.)

*Primary Examiner*—Rodney H. Bonck
*Assistant Examiner*—David Fenstermacher
*Attorney, Agent, or Firm*—Peter D. Keefe

[57] ABSTRACT

An electrically actuated power door lock actuator which provides simplicity, long term reliability, minimal mechanical complexity and solves the problem of back driving when the door lock mechanism is manually actuated. The power door lock actuator according to the present invention includes: a housing; a bi-directional electric motor; a threaded shaft drivingly connected with the drive shaft of the motor, the threaded shaft having a first end and an opposite second end; a drive armature threadingly engaged with the threaded shaft, wherein the drive armature has opposing first and second abutments; a toggle rotatably mounted to the housing, the toggle having bifurcated arms wherein a first arm has a third abutment for abutting the first abutment and a second arm has a fourth abutment for abutting the second abutment, the toggle further having a connector for connecting to a door lock mechanism; a first spring which biases the drive armature toward the second end of the threaded shaft; and a second spring which biases the drive armature toward the first end of the threaded shaft. When the motor is not operating the first and second springs cooperate to biasably locate the drive armature to a neutral position.

9 Claims, 3 Drawing Sheets

U.S. PATENT DOCUMENTS

| | | | |
|---|---|---|---|
| 4,059,360 | 11/1977 | Teissier . | |
| 4,135,377 | 1/1979 | Kleefeldt et al. . | |
| 4,200,405 | 4/1980 | Bauer . | |
| 4,269,440 | 5/1981 | Gelhard . | |
| 4,290,634 | 9/1981 | Gelhard . | |
| 4,478,531 | 10/1984 | Levinson et al. . | |
| 4,573,723 | 3/1986 | Morita et al. . | |
| 4,617,812 | 10/1986 | Rogers . | |
| 4,669,283 | 6/1987 | Ingenhoven | 70/264 |
| 4,674,781 | 6/1987 | Reece et al. . | |
| 4,708,378 | 11/1987 | Ingenhoven . | |
| 4,793,640 | 12/1988 | Stewart, Sr. . | |
| 4,819,493 | 4/1989 | Dornan . | |
| 4,821,521 | 4/1989 | Schuler . | |
| 4,885,922 | 12/1989 | Lutz . | |
| 4,893,704 | 1/1990 | Fry et al. . | |
| 4,932,277 | 6/1990 | Beaux | 74/89.15 |
| 4,932,690 | 6/1990 | Kleefeldt et al. . | |
| 4,978,155 | 12/1990 | Kobayashi . | |
| 5,037,145 | 8/1991 | Wilkes . | |
| 5,079,964 | 1/1992 | Hamada et al. . | |
| 5,137,312 | 8/1992 | Tang . | |
| 5,193,370 | 3/1993 | Norden . | |
| 5,328,218 | 7/1994 | Brusasco et al. . | |
| 5,373,752 | 12/1994 | Schlagwein | 74/89.15 |
| 5,441,315 | 8/1995 | Kleefeldt et al. . | |
| 5,472,065 | 12/1995 | Vergin . | |
| 5,526,710 | 6/1996 | Ohta . | |
| 5,634,676 | 6/1997 | Feder . | |

OTHER PUBLICATIONS

Picture of Power Door Lock Actuator of Ford Motor Co, Dearborn, MI; Believed Dated Before Sep. 1, 1994.

Picture of Power Door Lock Actuator of Chrysler Corp., Highland Park, MI Believed Dated Before Sep. 1, 1994.

Picture of Power Door Lock Actuator of General Motors Corp, Detroit MI; Built by ITT Automotive, Rochester, NY; On Market Since at Least Before Sep. 1, 1994.

Door Lock Actuator Product Part F812–25218A43–AA of Ford Motor Co., Dearborn, MI; Dated Oct. 1998.

DOOR LOCK ACTUATOR

CROSS-REFERENCE TO RELATED APPLICATIONS

The present application is a continuation-in-part application of application Ser. No. 08/523,114, filed on Sep. 1, 1995, now U.S. Pat. No. 5,634,676, issued on Jun. 3, 1997.

BACKGROUND OF THE INVENTION

1. Field of the Invention

The present invention relates to electrically actuated power door locks for automotive vehicles. More particularly, the present invention relates to a power door lock actuator of the motor drive type which provides simplicity, increased reliability and improved mechanical function as compared with prior power door lock actuators.

2. Description of the Related Art

Power door locks have become ubiquitous in motor vehicles, especially with the advent of remote entry systems. Power door locks provide electrical actuation of the door lock mechanism of a motor vehicle in response to a user pressing a switch.

There are two basic mechanisms that can provide power door lock actuation: a solenoid and a motor drive. Because solenoids are frequently noisy and sometimes actuation is unreliable, motor drives have become the actuator of choice.

Various motor drive type door lock actuators have been proposed and installed on production motor vehicles. A motor drive typically includes an electric motor, a gear set and an actuation mechanism responsive to the electric motor via the gear set. Problematical, however, is the situation when the user uses his or her key to unlock his or her car door lock, since the motor drive would then be back-driven and thereby offer unacceptable resistance to turning the key. This situation also arises when the user manually actuates the door lock button on the door. It has become known that a solution to the problem of the motor drive being back driven during manual and key operation of the door lock is to provide "lost motion" in the motor drive.

Following are descriptions of some interesting prior motor type door lock actuators. U.S. Pat. No. 4,819,493 describes the use of an inertial clutch to couple a rack and pinion gear set to the motor only when the motor is operating. U.S. Pat. No. 4,674,781 describes another rack and pinion gear set having a lost motion coupling wherein a pair of opposing springs return the rack to a neutral position between spaced apart, opposing abutments when the motor is turned off. Finally, U.S. Pat. No. 4,893,704 describes main and secondary threaded shafts with opposed threads that cooperate to axially move a drive member, wherein lost motion is provided by pins running free in a slot until one end or the other of the slot is encountered.

In spite of the many attempts in the art to provide an acceptable power door lock actuator, there yet remains needed a mechanically simple and reliable power door lock actuator which also solves the back driving problem when the door lock mechanism is manually actuated.

SUMMARY OF THE INVENTION

The present invention is an electrically actuated power door lock actuator which provides simplicity, long term reliability, minimal mechanical complexity and solves the problem of back driving when the door lock mechanism is manually actuated.

The power door lock actuator according to the present invention includes: a housing; a bidirectional electric motor; a threaded shaft drivingly connected with the drive shaft of the motor, the threaded shaft having a first end and an opposite second end; a drive armature threadingly engaged with the threaded shaft, wherein the drive armature has opposing first and second abutments; a toggle rotatably mounted to the housing, the toggle having bifurcated arms wherein a first arm has a third abutment for abutting the first abutment and a second arm has a fourth abutment for abutting the second abutment, the toggle further having a connector which in part exits the housing; a first spring which biases the drive armature toward the second end of the threaded shaft; and a second spring which biases the drive armature toward the first end of the threaded shaft. When the motor is not operating the first and second springs cooperate to biasably locate the drive armature to a neutral position.

Operation will now be described with an assumed direction of actuation of the door lock mechanism; should a particular door lock mechanism actuate from state to state in an opposite direction of actuation, then the movements described hereinbelow would be reversed.

In operation when a user wishes to change the door lock from the unlocked to the locked state, the user presses an electrical switch one way, the motor then becomes operative in a first direction of rotation and turns the threaded shaft in a first direction. The threaded shaft then threads with respect to the drive armature, causing it to move axially toward a first end of the threaded shaft. During this movement, the first spring is compressed against the drive armature and the first abutment of the drive armature abuts the third abutment of the first arm thereby causing the toggle to rotate in a first direction whereupon the connector rotates which, in turn, actuates the lock mechanism to the locked state. When the electrical switch is released, the first spring will cause the drive armature to return to the neutral position (as also defined by coaction with the second spring), whereupon the door lock may be actuated manually by button or key with only the toggle moving (ie., the drive armature is disconnected).

In operation when a user wishes to change the door lock from the locked to the unlocked state, the user presses the electrical switch another way, the motor then becomes operative in a second direction of rotation and turns the threaded shaft in a second direction (opposite the first direction of rotation). The threaded shaft then threads with respect to the drive armature, causing it to move axially toward a second end (opposite the first end) of the threaded shaft. During this movement, the second spring is compressed against the drive armature and the second abutment of the drive armature abuts the fourth abutment of the second arm thereby causing the toggle to rotate in a second direction (opposite the first direction) whereupon the connector rotates which, in turn, actuates the lock mechanism to the unlocked state. When the electrical switch is released, the second spring will cause the drive armature to return to the neutral position (as also defined by coaction with the first spring), whereupon the door lock may be actuated manually by button or key with only the toggle moving (ie., the drive armature is disconnected).

It is to be understood with regard to the foregoing discussion that the first and second arms of the bifurcated arms of the toggle are separated a predetermined angular distance with respect to the first and second abutments such that when the drive armature is at the neutral position and electrical power is turned off, the toggle is freely movable with respect to the drive armature over a preset distance of travel which is at least equal to the distance of travel of the door lock mechanism when manually actuated.

Accordingly, it is an object of the present invention to provide a power door lock actuator having few mechanical parts, high reliability and freedom from back driving when the door lock is manually actuated.

It is another object of the present invention to provide a power door lock actuator which operates on a threaded shaft principle, wherein lost motion is an inherent feature of interactive movement between a drive armature and bifurcated arms of a toggle.

It is an additional object of the present invention to provide a power door lock actuator which operates on a threaded shaft principle, wherein lost motion is provided by bifurcated arms of a toggle between which a drive armature moves along the threaded shaft, whereby opposing springs reposition the drive armature to a selected neutral position when electrical power is turned off so that the toggle is freely movable with respect to the drive armature over a preset distance of travel which is at least equal to the distance of travel of the door lock mechanism when manually actuated.

These, and additional objects, advantages, features and benefits of the present invention will become apparent from the following specification.

DETAILED DESCRIPTION OF THE PREFERRED EMBODIMENT

Figure 1:
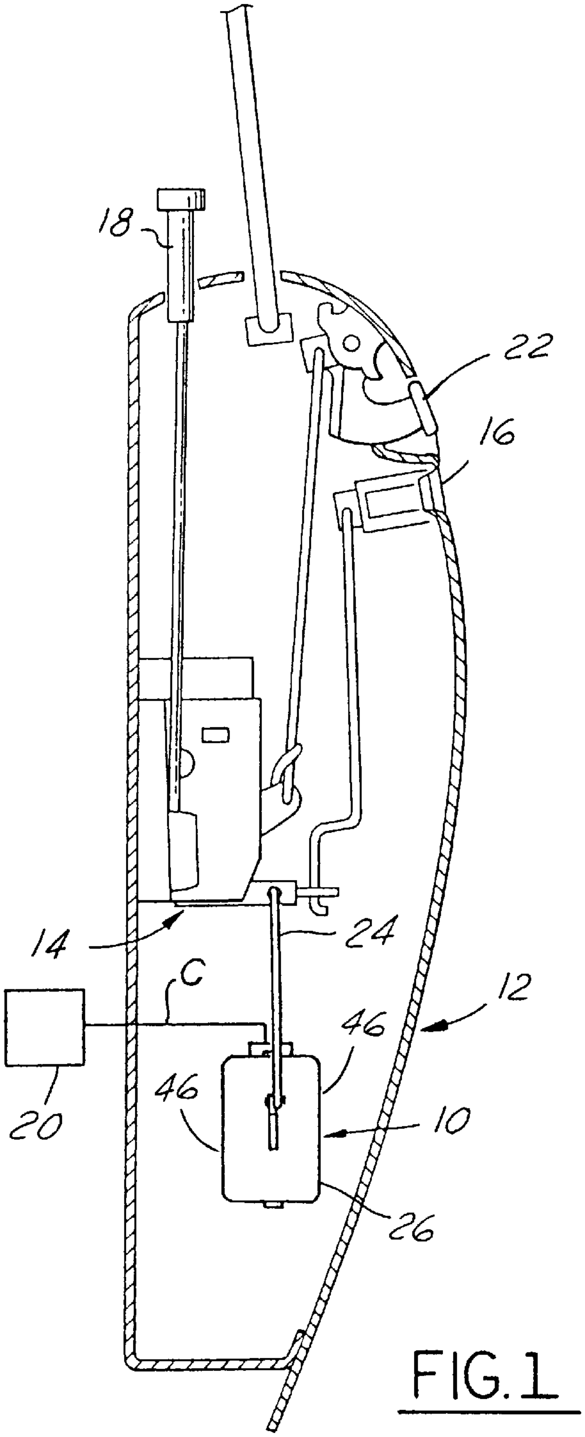
FIG. 1 is a partly schematic, partly sectional side view of an automobile door, including a side view of a door lock actuator according to a first form the present invention.

Referring now to the Drawing, FIG. 1 shows a power door lock actuator 10 according to a first form of the present invention (shown at FIGS. 2 through 5) in operation within a door 12 of a motor vehicle. In this regard, the door 12 is equipped with a door lock mechanism 14 which is actuable between a locked state and an unlocked state. The door lock mechanism 14 has two manual actuation modalities: a key actuation modality 16 and a button actuation modality 18. The door lock mechanism 14 further has a power actuation modality provided by the power door lock actuator 10 which is actuated by electrical power of the motor vehicle via a two position electrical switch 20. The door lock mechanism 14 is connected with a door handle 22, so as to control actuation thereof with respect to opening of the door 12.

In operation, when a user wishes to effect changing the door lock state from unlocked to locked, he or she presses the electrical switch 20 to a first position whereupon motor vehicle electrical power is supplied to the power door lock actuator 10. The power door lock actuator 10 then causes an actuator rod 24 which is linked to the door lock to move appropriately up or down to thereby cause the door lock to assume the locked state. When the user wishes to effect changing the door lock state from locked to unlocked, he or she presses the electrical switch 20 to a second position whereupon motor vehicle electrical power is supplied to the power door lock actuator 10. The power door lock actuator 10 then causes an actuator rod 24 which is linked to the door lock to move appropriately in the other direction to thereby cause the door lock to assume the unlocked state. Internally to the power door lock actuator 10, an advantageous and novel lost motion mechanism is provided whereby the user may manually actuate the door lock mechanism 14 without resistance thereto from the power door lock actuator 10, the nature of which will be disclosed in detail hereinbelow.

Figure 1A:
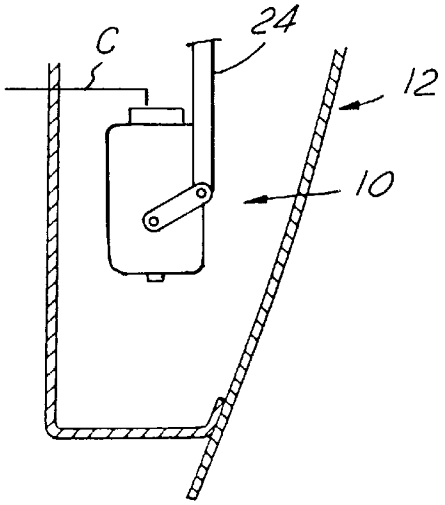
FIG. 1A is a detail view as in FIG. 1, now showing a door lock actuator according to a second form of the present invention.

FIG. 1A shows a detail view of a power door lock actuator according to a second form of the present invention (shown at FIGS. 6 and 7) in a similar environment of operation as depicted in FIG. 1.

The structure and function of the first form of the power door lock actuator 10 will now be detailed with greater specificity, with reference now being additionally directed to FIGS. 2 through 5. It will be noted that since FIGS. 2 through 5 have identical structures, that like numbers represent like parts, and that, accordingly, for the sake of clarity of the views, there is no need to repeat all numbers throughout all the Figures, which repetition is implicit.

As numerically indicated at FIG. 1 (yet common to FIGS. 2 through 5), the power door lock actuator 10 includes a housing 26 which is connected in a conventional manner to the motor vehicle door structure. A preferred material for the housing 26 is plastic. Mounted within the housing 26 is a bi-directional electric motor 28. The electric motor 28 preferably includes an internal thermistor (or other overload protector) to prevent overloading. An example of an acceptable electric motor 28 are models FC-280PT/ST manufactured by Mabuchi Motor of Japan. An electrical connector 30 is provided for conventionally connecting (preferably with a lock tab feature 30*a*) to an electrical circuit C (see FIG. 1) which includes the electrical switch 20 and the electrical system of the motor vehicle.

Figure 2:
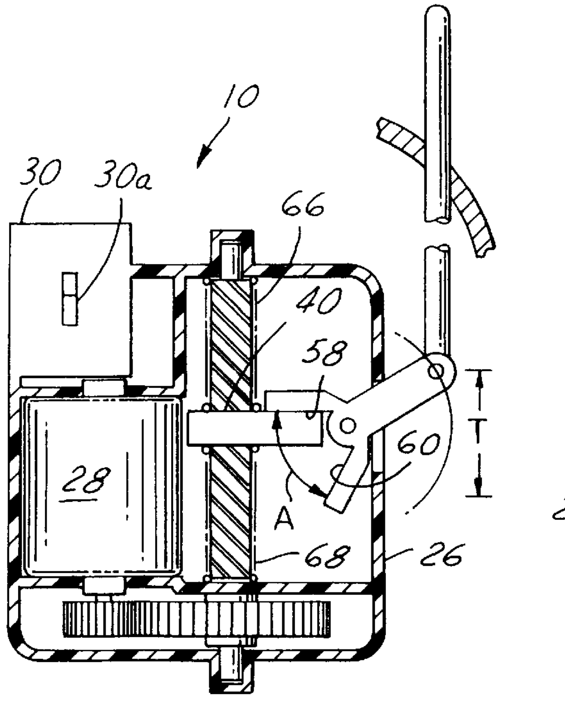
FIG. 2 is a partly sectional side view of a power door lock actuator according to the first form of the present invention, seen with the driven armature in the neutral position after having previously unlocked a door lock mechanism.
Figure 3:
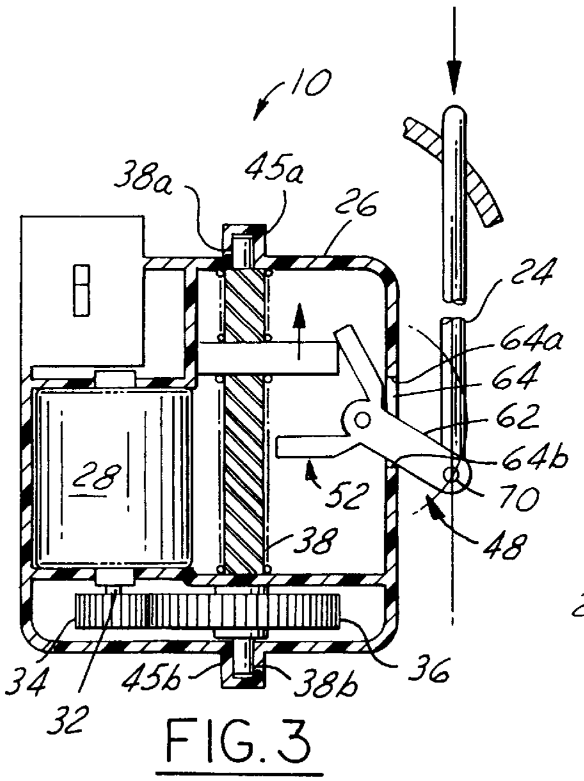
FIG. 3 is a partly sectional side view of the power door lock actuate according to the first form of the present invention, in now with the driven armature in a position effecting locking of the door lock mechanism.

As numerically indicated at FIG. 3 (yet common to FIGS. 2 through 5), the electric motor 28 has a drive shaft 32 to which is connected to a drive gear 34. The drive gear 34 is gearingly meshed with a driven gear 36. The driven gear 36 is connected to threaded shaft 38. The threaded shaft 38 has a first end 38*a* and an opposite second end 38*b*. The first end 38*a* is rotatably seated in a first bearing seat 45*a* formed in the housing 26, and the second end 38*b* is rotataby seated in a second seat 45*b* also formed in the housing 26. The driven gear 36 is located adjacent the second seat 45*b*. Accordingly, when the electric motor 28 is operating, the drive and driven gears 32, 34 cause the threaded shaft 38 to rotate.

Figure 4:
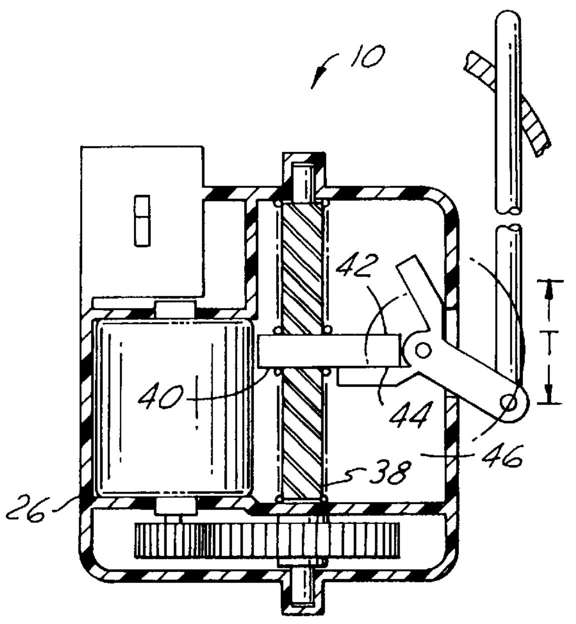
FIG. 4 is a partly sectional side view of the power door lock actuator according to the first form of the present invention, seen with the driven armature in the neutral position after having previously locked the door lock mechanism.
Figure 7:
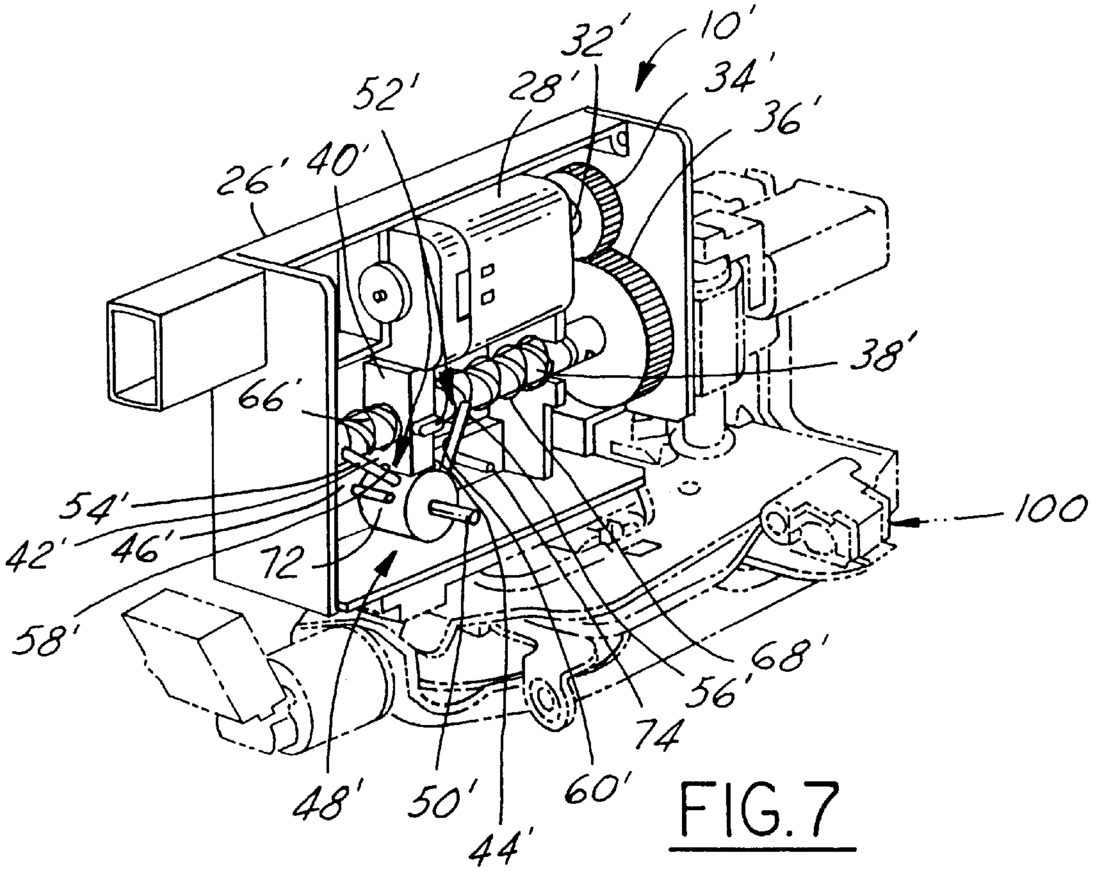
FIG. 7 is a right perspective, broken away view of a power door lock actuator according to the second form of the present invention, wherein an adjacent door lock mechanism is shown in phantom.

As numerically indicated at FIG. 4 (yet common to FIGS. 2 through 5), a drive armature 40 is threadably engaged with the threaded shaft 38. The drive armature 40 has a first abutment 42 and an opposite second abutment 44. The drive armature 40 is prevented from rotating with the threaded shaft by axially slidable abutment of the drive armature with at least one of the sides 46 of the housing 26. In this regard, FIG. 7 shows a tab of the drive armature 40' for guidingly interfacing with the housing. Accordingly, when the threaded shaft 38 rotates, the drive armature 40 will either axially thread up or down the threaded shaft depending upon the direction of rotation of the threaded shaft.

Figure 5:
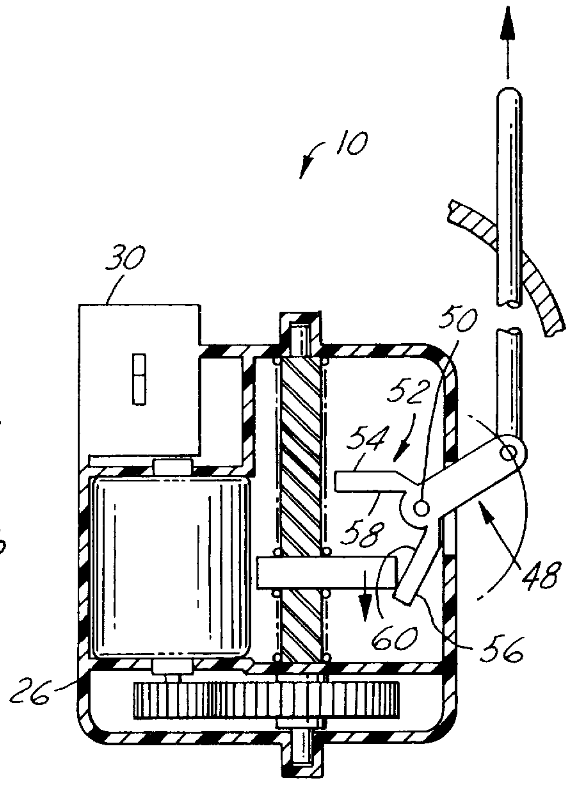
FIG. 5 is a partly sectional side view of a power door lock actuator according to the first form of the present invention, seen with the driven armature in a position effecting locking of the door lock mechanism.

As numerically indicated at FIG. 5 (yet common to FIGS. 2 through 5), a toggle 48 is rotatably mounted to the housing 26, such as by a shaft 50. Interior to the housing 26, the toggle 48 has bifurcated arms 52, composed of a first arm 54 and a second arm 56. The first arm 54 has a third abutment 58 and the second arm 56 has a fourth abutment 60.

As numerically indicated at FIG. 2 (yet common to FIGS. 2 through 5), the third abutment 58 is angularly separated an angle A with respect to the fourth abutment 60, such as for example about sixty degrees. The relative placement of the first, second, third and fourth abutments will be further discussed hereinbelow.

As numerically indicated at FIG. 3 (yet common to FIGS. 2 through 5), a connector 62 in the form of a tab is connected with the toggle 48 opposite the bifurcated arms 52. The connector 62 projects outwardly from the housing 26 via a slot 64. The slot has an upper end 64*a* and an opposite lower end 64*b*. The end of the connector 62 is rotatively connected (such as by a pin 70) with a rod 24 of the door lock 14.

In operation, the first abutment 42 of the drive armature 40 abuts selectively with the third abutment 58 of the toggle 48, and further the second abutment 42 of the drive armature abuts selectively with the fourth abutment 60 of the toggle. Consequently, the toggle 48 is selectively caused to rotatively pivot on the pin 50 in response to the drive armature 40 being threaded up or down the threaded shaft 38.

The maximum travel of the drive armature 40 is provided by stops at either end of its travel, such as for example upper and lower ends 64*a,* 64*b* of the slot 64 abutting the connector 62 (see comparatively FIGS. 3 and 5). This travel distance provides a "lost motion" travel distance T for the toggle 48 (see FIG. 2).

As numerically indicated at FIG. 2 (yet common to FIGS. 2 through 5), a first coil spring 66 is trapped between the housing 26 and one side of the drive armature 40. A second coil spring 68 is trapped between the housing 26 and the other side of the drive armature 40. Each of the springs 66, 68 is preferably of equal length and has sufficient, preferably equal, resilient spring tension to cause the drive armature 40 to be located at a neutral position situated therebetween, as shown at FIGS. 2 and 4, which is preferably substantially medial of the threaded portion of the threaded shaft 38, when the electric motor 28 is not operating. In this regard, as the springs 66, 68 cause the drive armature 40 to reach the neutral position, the threaded shaft 38 is caused to rotate, thereby back-driving the electric motor 28 through the drive and driven gears 34, 36. When the drive armature 40 is at the neutral position, as shown at FIGS. 2 and 4, a user can actuate the door lock mechanism 14 manually via a key or the button and no back-driving of the electric motor will occur thereduring, as only the toggle 48 will move (pivotally on the pin 50), since the third and fourth abutments 58, 60 thereof will not encounter the first and second abutments 42, 44 during this movement (which is less than or equal to the aforementioned "lost motion" travel distance T).

Preferably, as shown, the third and fourth abutments 58, 60 are engagable with respective first and second abutments 42, 44 when the toggle is freely rotated to the respective limits of rotational travel and drive armature is at the neutral position. In this regard, the first, second, third and fourth abutments are mutually spaced to provide the free rotatability of the toggle (ie., rotating without striking the drive armature, and merely touching it at the limits of rotation) when the drive armature is at its neutral position.

Operation will now be detailed with reference being particularly directed to FIGS. 2 through 5. It will be understood that an assumed direction of movement of the drive armature causes an assumed actuation of the door lock mechanism from one state to another, which is presented hereinbelow by way of example only; the reversal of these movements would be applicable to another particular door lock mechanism, wherein the states thereof are actuated by movement directions in reverse of the below described movements.

A. Unlocked State to Locked State, FIGS. 2 through 4

The power door lock actuator 10 is initially in the configuration shown in FIG. 2, wherein the drive armature 40 is at the neutral position.

To change the door lock mechanism 14 from the unlocked to the locked state, a user presses an electrical switch 20 one way, the motor 28 then becomes operative in a first direction of rotation and turns the threaded shaft 38 in a first direction. The threaded shaft then threads with respect to the drive armature 40, causing it to move axially toward a first end 38*a* of the threaded shaft. During this movement, the first spring 66 is compressed against the drive armature and the first abutment 42 of the drive armature abuts the third abutment 58 of the first arm 54 thereby causing the toggle 48 to rotate in a first direction whereupon the connector 62 rotates which, in turn, actuates the lock mechanism to the locked state. The maximum travel of the drive armature is determined by the connector striking the lower end 64*b* of the slot 64, as shown at FIG. 3. When the electrical switch is released, the first spring will cause the drive armature to return to the neutral position (as also defined by coaction with the second spring), whereby the threaded shaft 38 rotates (and thereduring back drives the electric motor 28), whereupon the door lock mechanism 14 may be actuated manually by button or key without thereduring back-driving of the electric motor and only the toggle moving due to the "lost motion" travel T, as depicted in FIG. 4.

B. Locked State to Unlocked State, FIGS. 4, 5 and 2

The power door lock actuator 10 is initially in the configuration shown in FIG. 4, wherein the drive armature 40 is at the neutral position.

To change the door lock mechanism 14 from the locked to the unlocked state, the user presses the electrical switch another way, the motor 28 then becomes operative in a second direction of rotation (opposite the first direction of rotation) and turns the threaded shaft 38 in a second direction (opposite the first direction of rotation). The threaded shaft then threads with respect to the drive armature 40, causing it to move axially toward a second end 38*b* of the threaded shaft. During this movement, the second spring 68 is compressed against the drive armature and the second abutment 46 of the drive armature abuts the fourth abutment 60 of the second arm 56 thereby causing the toggle 48 to rotate in a second direction (opposite the first direction)

whereupon the connector 62 rotates which, in turn, actuates the door lock mechanism to the unlocked state. The maximum travel of the drive armature is determined by the connector striking the upper end 64*a* of the slot 64, as shown at FIG. 5. When the electrical switch is released, the second spring will cause the drive armature to return to the neutral position (as also defined by coaction with the first spring), whereby the threaded shaft 38 rotates (and thereduring back drives the electric motor 28), whereupon the door lock mechanism 14 may be actuated manually by button or key without thereduring back-driving of the electric motor and only the toggle moving due to the "lost motion" travel T, as depicted in FIG. 2.

While not necessary, an elastomeric boot may be fitted to the exterior of the housing at the slot which limits passage of contaminants and moisture through the slot.

Figure 6:
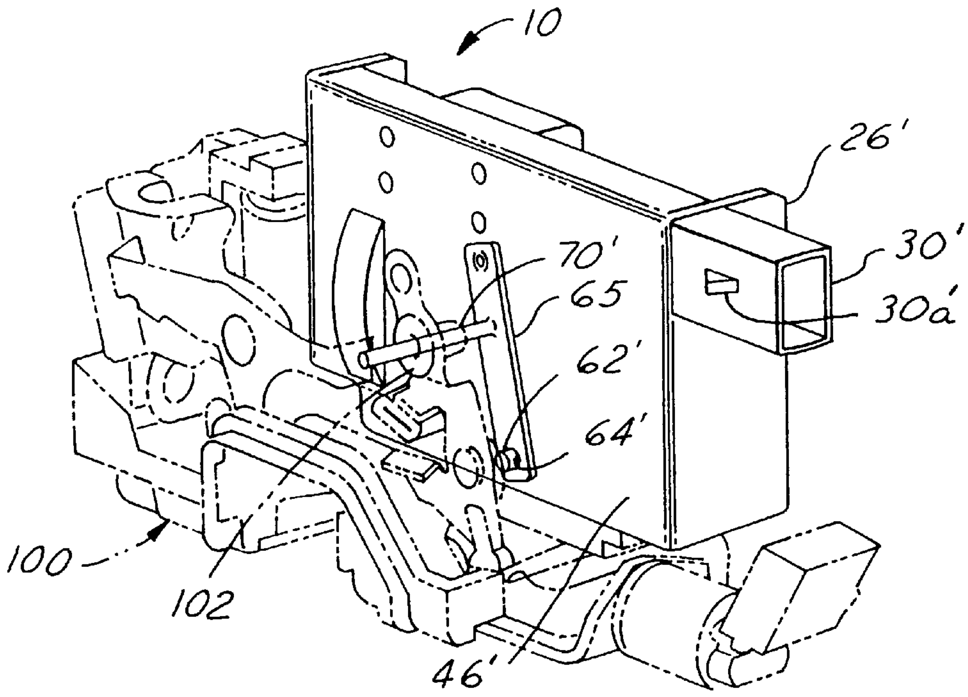
FIG. 6 is a left perspective, broken away view of a power door lock actuator according to the second form of the present invention, wherein an adjacent door lock mechanism is shown in phantom.

Now, the door lock actuator 10' according to the second form of the present invention will be discussed with reference being directed to FIGS. 6 and 7. In that the basic operative features of the first and second forms 10, 10' of the door lock actuator according to the present invention are quite similar. Accordingly, for the sake of brevity, parts having like structure and like function will be designated with like numbers having a prime, an in depth discussion of the structure and operation thereof is unnecessary in view of the detailed discussion hereinabove regarding FIGS. 2 through 5.

The power door lock actuator 10' is shown mounted to a door lock mechanism 100, such as for example a Ford Motor Company model D21, which is indicated in phantom. The power door lock actuator 10' includes a housing 26' which is connected in a conventional manner to the door lock mechanism 100. Mounted within the housing 26' is a bi-directional electric motor 28', which preferably includes an internal thermistor (or other overload protector) to prevent overloading. An electrical connector 30' is provided for conventionally connecting (preferably with a lock tab feature 30*a'*) to an external electrical circuit which includes an electrical switch and the electrical system of the motor vehicle.

The electric motor 28' has a drive shaft 32' to which is connected to a drive gear 34'. The drive gear 34' is gearingly meshed with a driven gear 36'. The driven gear 36' is connected to a threaded shaft 38' having a first end and an opposite second end mounted with respect to the housing. Accordingly, when the electric motor 28' is operating, the drive and driven gears 34', 36' cause the threaded shaft 38' to rotate.

A drive armature 40' is threadably engaged with the threaded shaft 38'. The drive armature 40' has a first abutment 42' and an opposite second abutment 44'. The drive armature 40' is prevented from rotating with the threaded shaft by axially slidable abutment of the drive armature with at least one of the sides 46' of the housing 26', preferably guided via a nib on each side of the drive armature sliding in and along a respective slot in each of the sides of the housing. Accordingly, when the threaded shaft 38' rotates, the drive armature 40' will either axially thread up or down the threaded shaft depending upon the direction of rotation of the threaded shaft.

A toggle 48' is rotatably mounted to the housing 26' by a shaft 50'. Interior to the housing 26', the toggle 48' has bifurcated arms 52', composed of a first arm 54' and a second arm 56'. The first arm 54' has a third abutment 58' and the second arm 56' has a fourth abutment 60'.

A connector 62' is provided in the form of an extension of the shaft 50' wherein the shaft and its extension rotate in unison with the toggle 48'. The connector 62' projects outwardly from the housing 26' via an aperture 64'. The end of the connector 62' is provided with an arm 65 which is, in turn, rotatively connected (such as by a pin 70') with a finger 102 of the door lock mechanism 100.

The maximum travel of the drive armature 40' is provided by stops at either end of its travel, such as for example by upper and lower pedestals 72, 74 which are connected with the housing 26' and which abut, respectively, the first and second arms 54', 56' at the maximum travel locations. The travel distance therebetween provides a "lost motion" travel distance for the toggle 48'.

A first coil spring 66' is trapped between the housing 26' and one side of the drive armature 40'. A second coil spring 68' is trapped between the housing 26' and the other side of the drive armature 40'. Each of the springs 66', 68' is preferably of equal length and has sufficient, preferably equal, resilient spring tension to cause the drive armature 40' to be located at a neutral position therebetween, preferably substantially medial of the threaded portion of the threaded shaft 38', when the electric motor 28' is not operating.

Preferably, the third and fourth abutments 58', 60' are engagable with respective first and second abutments 42', 44' when the toggle is freely rotated to the limits of rotational travel and drive armature is at the neutral position. In this regard, the first, second, third and fourth abutments are mutually spaced to provide the free rotatability of the toggle (ie., rotating without striking the drive armature, and merely touching it at the limits of rotation) when the drive armature is at the neutral position.

In operation, the first abutment 42' of the drive armature 40' abuts selectively with the third abutment 58' of the toggle 48', and further the second abutment 44' of the drive armature abuts selectively with the fourth abutment 60' of the toggle. Consequently, the toggle 48' is selectively caused to rotatively pivot along with the shaft 50' in response to the drive armature 40' being threaded up or down the threaded shaft 38'. When the motor is turned off, the springs 66', 68' cause the drive armature 40' to reach the neutral position, the threaded shaft 38' is caused to rotate, thereby back-driving the electric motor 28' through the drive and driven gears 34', 36'. When the drive armature 40' is at the neutral position, a user can actuate the door lock mechanism 100 manually via a key or the button and no back-driving of the electric motor will occur thereduring, as only the toggle 48' will move pivotally, since the third and fourth abutments 58', 60' thereof will not encounter the first and second abutments 42', 44' during this movement (which is less than or equal to the aforementioned "lost motion" travel distance).

It is to be noted that the mechanical advantage of the toggle vis-a-vis the motor is adjustable depending upon the selection of gear ratios, thread pitch and the distance between where the first and second arms abut the drive armature and the location of the pivot of the toggle. For example, in a certain design it may be preferable for the shaft 50' to be further spaced from the threaded shaft 38' than shown in FIG. 7.

It is to be further noted that with the toggle, threaded shaft and drive armature arrangement of the power door lock actuator 10' according to the second form of the present invention, two sets of first and second arms may be provided, one set of first and second arms being located at each side of the threaded shaft. While increasing costs, this may serve to reduce any tendency toward thread binding of the drive armature with respect to the threaded shaft, should this be a concern with respect to a particular design of power door lock actuator 10'. In such a case where two sets of first and second arms are provided, the two first arms act collectively as a first arm having a first abutment, and wherein the two second arms act collectively as a second arm having a second abutment.

To those skilled in the art to which this invention appertains, the above described preferred embodiment may be subject to change or modification. For example, the embodiment described herein is to be merely considered a best mode for carrying out the invention, and that many other embodiments can be envisioned based upon the principles described herein for adapting the present invention to the particulars associated with the door lock mechanisms and power door lock actuators therefor of the various vehicles of the various original equipment automotive manufacturers. Such change or modification can be carried out without departing from the scope of the invention, which is intended to be limited only by the scope of the appended claims.

What is claimed is:

1. A power door lock actuator for actuating a door lock mechanism, comprising:

a housing;

a bi-directional electric motor located in said housing;

connection means provided on said housing for connecting said electric motor to an external electrical circuit;

a threaded shaft rotatably connected with said housing, said threaded shaft having a first end and an opposite second end;

drive means for drivingly connecting said electric motor to said threaded shaft so that said electric motor provides rotation of said threaded shaft relative to said housing;

a drive armature threadably engaged with said threaded shaft in a non-rotational relationship therewith, and in a slidable relationship with said housing;

a toggle rotatably mounted to said housing;

interaction means for causing said toggle to rotate to a first position responsive to said drive armature threading on said threaded shaft to a first location of said housing, and for causing said toggle to rotate to a second position responsive to said drive armature threading on said threaded shaft to a second location of said housing;

biasing means for biasing said drive armature to a neutral position between said first and second locations whereat said toggle is freely rotatable between said first and second positions;

wherein selected actuation of said electric motor causes selected rotation of said threaded shaft whereupon said drive armature threads with respect to said threaded shaft thereby selectively moving said drive armature with respect to said threaded shaft to one of said first and second locations during which movement said toggle rotates, respectively to one of said first and second positions; and wherein when said actuation of said electric motor ceases, said biasing means repositions said drive armature to said neutral position, whereat said toggle is freely rotatable between said first and second positions.

2. The door lock actuator of claim 1, wherein said interaction means comprises:

a first abutment on said drive armature;

a second abutment on said drive armature opposite said first abutment; and bifurcated arms connected with said toggle, said bifurcated arms comprising:

a first arm having a third abutment; and a second arm having a fourth abutment;

wherein said first abutment abuts said third abutment to cause said toggle to rotate in a first direction, and wherein said second abutment abuts said fourth abutment to cause said toggle to rotate in a second direction opposite to said first direction.

3. The door lock actuator of claim 2, wherein said first and third abutments are spaced relative to each other and said second and fourth abutments are spaced relative to each other so as to provide said free rotatability of said toggle.

4. The door lock actuator of claim 1, wherein said biasing means comprises:

first spring means for biasing said drive armature from said first location toward said neutral position; and second spring means for biasing said drive armature from said second location toward said neutral position.

5. The door lock actuator of claim 1, further comprising connector means for connecting said toggle to a component of a door lock mechanism.

6. The door lock actuator of claim 5, wherein said connector means in part exits said housing for connecting to the component of a door lock mechanism.

7. The door lock actuator of claim 5, wherein said interaction means comprises:

a first abutment on said drive armature;

a second abutment on said drive armature opposite said first abutment; and bifurcated arms connected with said toggle, said bifurcated arms comprising:

a first arm having a third abutment; and a second arm having a fourth abutment;

wherein said first abutment abuts said third abutment to cause said toggle to rotate in a first direction, and wherein said second abutment abuts said fourth abutment to cause said toggle to rotate in a second direction opposite to said first direction.

8. The door lock actuator of claim 7, wherein said first and third abutments are spaced relative to each other and said second and fourth abutments are spaced relative to each other so as to provide said free rotatability of said toggle.

9. The door lock actuator of claim 7, wherein said biasing means comprises:

first spring means for biasing said drive armature from said first location toward said neutral position; and second spring means for biasing said drive armature from said second location toward said neutral position.

* * * * *